(12) United States Patent
Wang

(10) Patent No.: US 6,728,203 B2
(45) Date of Patent: Apr. 27, 2004

(54) SYSTEMS AND METHODS FOR SELECTING A CELL IN A COMMUNICATIONS NETWORK

(75) Inventor: Yi-Pin Eric Wang, Cary, NC (US)

(73) Assignee: Telefonaktiebolaget L.M. Ericsson (SE)

( * ) Notice: Subject to any disclaimer, the term of this patent is extended or adjusted under 35 U.S.C. 154(b) by 233 days.

(21) Appl. No.: 09/859,535

(22) Filed: May 18, 2001

(65) Prior Publication Data

US 2002/0181391 A1 Dec. 5, 2002

(51) Int. Cl.$^7$ .......................... H04J 11/00; H04B 7/216
(52) U.S. Cl. .................... 370/210; 370/335; 370/342
(58) Field of Search ................... 370/329, 330, 370/335, 336, 341, 342, 208, 209, 210; 375/130, 134, 135, 136, 149, 150

(56) References Cited

U.S. PATENT DOCUMENTS 6,385,264 B1 * 5/2002 Terasawa et al. ........... 375/371
6,480,558 B1 * 11/2002 Ottosson et al. ............ 375/350

FOREIGN PATENT DOCUMENTS

| EP | 0 892 528 A2 | 1/1999 |
|---|---|---|
| WO | WO 01/54287 A2 | 7/2001 |

OTHER PUBLICATIONS

K. Higuchi et al., "Fast Cell Search Algorithm Using Long Code Masking in DS–CDMA Asynchronous Cellular System", Tech. Rep. IEICE, Jan. 1997, pp. 57–62 (and English translation, pp. 1–6).

Siemens and Texas Instruments, "Generalised Hierarchical Golay Sequence for PSC with low complexity correlation using pruned efficient Golay correlators", 3GPP Tech. Doc. Tdoc R1–99554, Cheju, Korea, Jun. 1999, pp. 1–6.

S. Sriram et al., "Fast Acquisition Method for DS–CDMA Systems Employing Asynchronous Base Stations", in Proc. IEEE Int. Conf. Commun., Jun. 1999, pp. 1928–1932.

"Cell Search in W–CDMA," by Yi–Pin Eric Wang et al., IEEE Journal on Selected Areas in Communications, vol. 18, No. 8, Aug. 2000, pp. 1470–1482.

"Comparison of Cell Search Methods for Asynchronous Wideband CDMA Cellular System," by Johan Nyström et al., IEICE Trans. Fundamentals, vol. E82–A, No. 10, Oct. 1999, pp. 2115–2120.

"Fast Cell Search Algorithm in Idle Mode for Inter–Cell Asynchronous W–CDMA Mobile Radio," by Yukiko Hanada et al., IEICE Trans. Communications, vol. E83–B, No. 8, Aug. 2000, pp. 1610–1618.

"Initial Frequency Acquisition in W–CDMA," by Yi–Pin Eric Wang et al., Proceedings of IEEE Vehicular Technology Conference, 1999, Amsterdam.

"Cell Search Algorithms and Optimization in W–CDMA," by Yi–Pin Eric Wang et al., Proceedings of IEEE Vehicular Technology Conference, 2000, Tokyo.

* cited by examiner

Primary Examiner—Chau Nguyen
Assistant Examiner—Soon-Dong Hyun
(74) Attorney, Agent, or Firm—Coats & Bennett, P.L.L.C.

(57) ABSTRACT

A system searches for a cell and determines a frequency error estimate in a communications network. The system generates a slot boundary candidate. The system identifies a scrambling code group using the slot boundary list, identifies a scrambling code from the scrambling code group, and determines a frequency error estimate using the identified scrambling code. The system also determines a detection metric, compares the detection metric to a predetermined threshold, and selects the frequency error estimate when the detection metric is greater than the predetermined threshold.

18 Claims, 7 Drawing Sheets

SYSTEMS AND METHODS FOR SELECTING A CELL IN A COMMUNICATIONS NETWORK

BACKGROUND OF THE INVENTION

The present invention relates generally to networks and, more particularly, to systems and methods for selecting a cell in a wireless communications network.

At startup, a mobile terminal may perform a cell search operation to find, identify, and synchronize to a cell in the communications network. In a wideband code division multiple access (WCDMA) network, this cell search operation may consist of a three-stage pipeline process, as described, for example, in "Cell Search in W-CDMA," by Yi-Pin Eric Wang et al., IEEE J. Select. Areas Commun., Vol. 18, No. 8, August 2000, pp. 1470–1482.

The goal of the three-stage pipeline process is to achieve time and code synchronization. In stage 1, the mobile terminal generates a slot boundary candidate. Stage 2 of the pipelined process receives the slot boundary candidate and identifies a frame boundary and scrambling code group pair. Finally, in stage 3, the mobile terminal uses the frame boundary-code group pair to identify a scrambling code. The mobile terminal may perform a verification and termination operation in stage 3 to determine a confidence score of the candidate scrambling code. When the mobile terminal detects a candidate with a high confidence score, the mobile terminal may perform a frequency acquisition operation. When a candidate having a high confidence score is not detected in stage 3, the mobile terminal continues the pipeline process.

BRIEF SUMMARY OF THE INVENTION

Systems and methods, consistent with the present invention, facilitate the selection of a cell in a wireless communications network.

In accordance with the invention as embodied and broadly described herein, a method for selecting a frequency error estimate in a wireless communications network is provided. The method includes generating a slot boundary candidate, identifying a frame boundary and scrambling code group for the slot boundary candidate, identifying a scrambling code from the identified scrambling code group, determining a frequency error estimate using the identified scrambling code, determining a detection metric, comparing the detection metric to a predetermined threshold, and selecting the frequency error estimate when the detection metric is greater than the predetermined threshold.

In another implementation consistent with the present invention, a system for selecting a frequency error estimate in a WCDMA system is provided. The system includes a first stage that generates a slot boundary candidate, a second stage that receives the slot boundary candidate and identifies a frame boundary and scrambling code group, a third stage that receives the scrambling code group and identifies a scrambling code, and a fourth stage that receives the scrambling code, determines a frequency error estimate using the scrambling code, generates a detection metric, and selects the frequency error estimate when the detection metric exceeds a threshold.

In yet another implementation consistent with the present invention, a four-stage pipelined system is disclosed. The pipelined system includes a first stage that detects a slot boundary, a second stage that receives the slot boundary and identifies a frame boundary and scrambling code group based on the slot boundary, a third stage that receives the frame boundary and scrambling code group and identifies at least one scrambling code based on the frame boundary and scrambling code group, and a fourth stage that receives the scrambling code and performs frequency acquisition and cell search verification and termination.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION OF THE INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods, consistent with the present invention, allow a mobile terminal to search for and select a cell in a wireless communication network.

Figure 1:
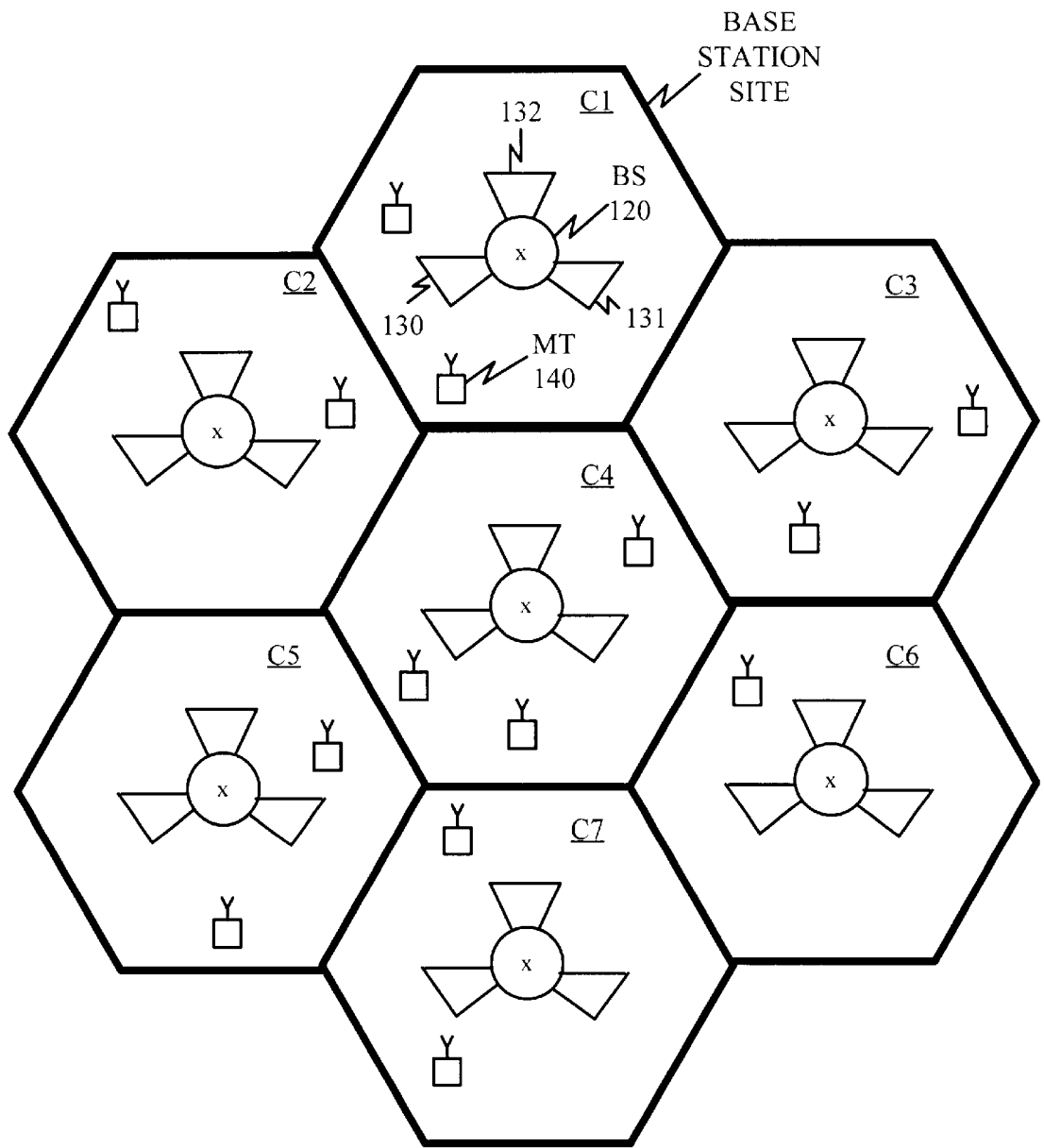
FIG. 1 illustrates an exemplary asynchronous wireless communications network in which systems and methods, consistent with the present invention, may be implemented.

FIG. 1 illustrates an exemplary asynchronous wireless communications network 100 in which systems and methods, consistent with the present invention, may be implemented. In FIG. 1, the network 100 includes seven base station sites, labeled C1–C7. While the network 100 shows only seven base station sites, the actual number of sites may be larger or smaller in practice.

Each of the base station sites C1–C7 includes a base station (BS) 120, having, for example, three directional antennas 130–132, and may, at any given time, include one or more mobile terminals (MTs) 140. The directional antennas 130–132 divide each base station site C1–C7 into three cells, each associated with a unique scrambling code. Each directional antenna 130–132 may include one or more individual antennas.

The base stations 120 may include a conventional base station that receives information from and transfers information to the mobile terminals 140 via the directional antennas 130–132. Each base station 120 may include one or more base transceiver stations (not shown) and a base station controller (not shown). The base transceiver stations may transmit radio signals to and receive radio signals from the mobile terminals 140. The base station controller may interconnect a number of base transceiver stations to a network management device, such as a mobile switching center (MSC).

In an implementation consistent with the present invention, the base stations 120 communicate with the mobile terminals 140 via WCDMA communication techniques. Each directional antenna 130–132 of the base station 120 transmits a unique downlink scrambling code. The set of scrambling codes available in the network 100 are divided into groups with a limited number of codes in each group. In addition, each base station 120 periodically transmits two, mutually orthogonal special code words, known as the primary and secondary synchronization codes. The primary synchronization code may be the same for each base station site C1–C7 in the network 100. The base stations 120 may transmit the primary and secondary synchronization codes at a predetermined position (e.g., in the first 256 chips in each slot) in the downlink stream. It will be appreciated that according to WCDMA specifications, one radio frame of 38400 chips (or 10 ms) is divided into 15 slots, each of 2560 chips (or 0.67 ms).

As described herein, the mobile terminal 140 may include a radiotelephone with or without a multi-line display; a Personal Communications System (PCS) terminal that may combine a cellular radiotelephone with data processing, facsimile, and data communications capabilities; a Personal Digital Assistant (PDA) that can include a radiotelephone, pager, Internet/intranet access, Web browser, organizer, and/ or calendar; and a conventional laptop and/or palmtop receiver or other appliance that includes a radiotelephone transceiver. Mobile terminals may also be referred to as "pervasive computing" devices.

Figure 2:
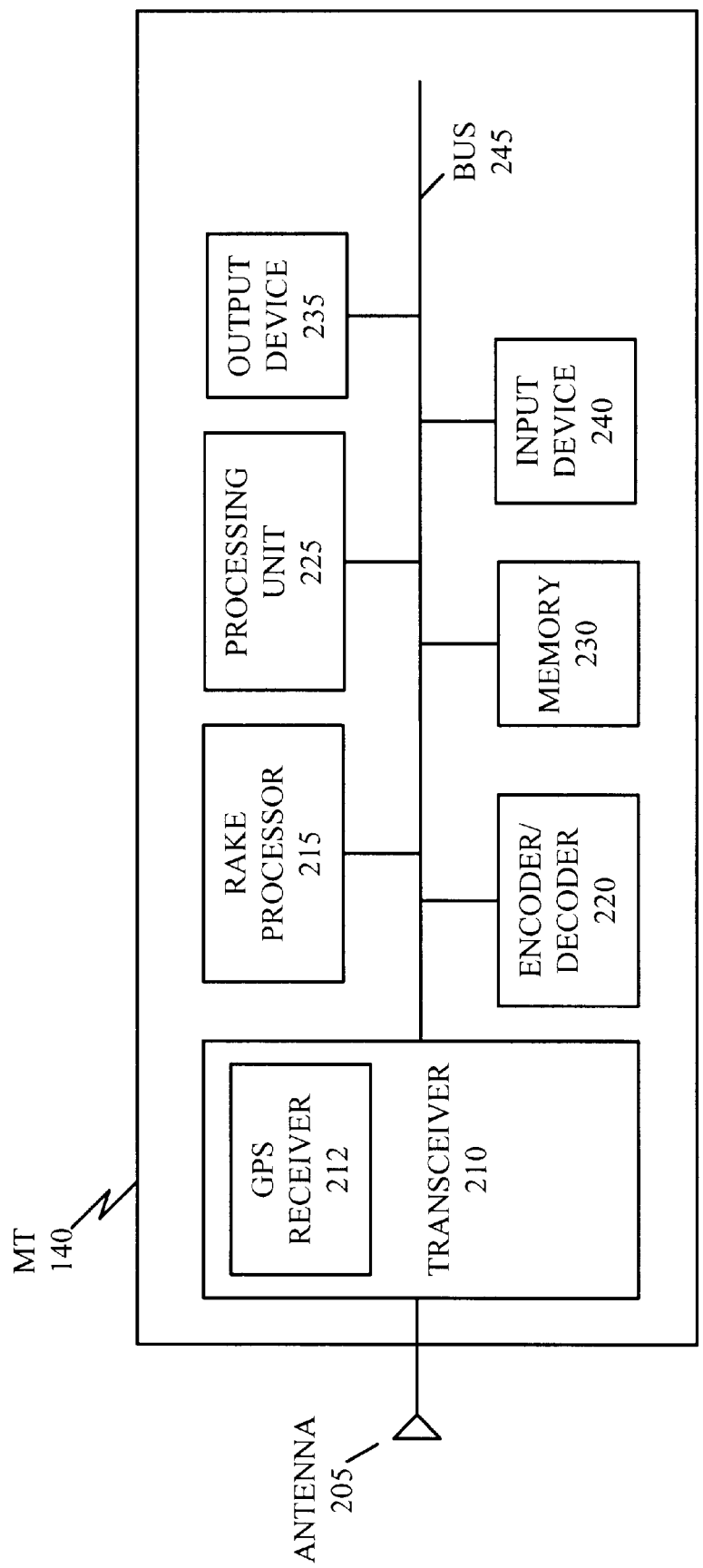
FIG. 2 illustrates an exemplary configuration of a mobile terminal consistent with the present invention.

FIG. 2 illustrates an exemplary configuration of a mobile terminal 140 consistent with the present invention. As illustrated, the mobile terminal 140 may include an antenna 205, a transceiver 210, a RAKE processor 215, an encoder/ decoder 220, a processing unit 225, a memory 230, an output device 235, an input device 240, and a bus 245.

The antenna 205 may include one or more conventional antennas capable of transmitting and receiving information. The transceiver 210 may include well-known transceiver circuitry for transmitting and/or receiving data bursts in a network, such as network 100, via the antenna 205. The transceiver 210 may also include a global positioning system (GPS) receiver 212 that aids the mobile terminal 140 in determining its position within the network 100.

The RAKE processor 215 may include one or more correlators (also known as fingers) for dispreading the received spread spectrum signal. The encoder/decoder 220 may include conventional circuitry for encoding and/or decoding received or transmitted symbol sequences.

The processing unit 225 may include any type of conventional processor or microprocessor that interprets and executes instructions. The processing unit 225 may perform all data processing functions for inputting, outputting, and processing of data. The memory 230 may provide permanent, semi-permanent, or temporary working storage of data and instructions for use by processing unit 225 in performing processing functions. Memory 230 may include large-capacity storage devices, such as a magnetic and/or optical recording medium and its corresponding drive.

The output device 235 may include one or more conventional mechanisms that output information to an operator, including a display, a printer, a speaker, etc. The input device 240 may include one or more conventional mechanisms that permit the operator to input information to the mobile terminal 140, such as a keypad, a mouse, a microphone, a pen, voice recognition and/or biometric mechanisms, etc. The output and input devices 235 and 240 may include additional devices (not shown) for converting received information from a first format into a second format.

The bus 245 may include one or more conventional buses that interconnect the various components of mobile terminal 140 to permit the components to communicate with one another.

The configuration of mobile terminal 140, shown in FIG. 2, is provided for illustrative purposes only. One skilled in the art will recognize that other configurations may be employed. Moreover, one skilled in the art will appreciate that a typical mobile terminal 140 may include other devices that aid in the reception, transmission, or processing of data.

Typically, when the mobile terminal 140 is first powered up, it attempts to find, identify, and synchronize to a cell to which the mobile terminal 140 has the lowest path and shadowing loss. The goal of the initial cell search is to achieve code, time, and frequency synchronization to the serving base station. In an implementation consistent with the present invention, the cell search involves a four-stage pipeline process.

Figure 3:
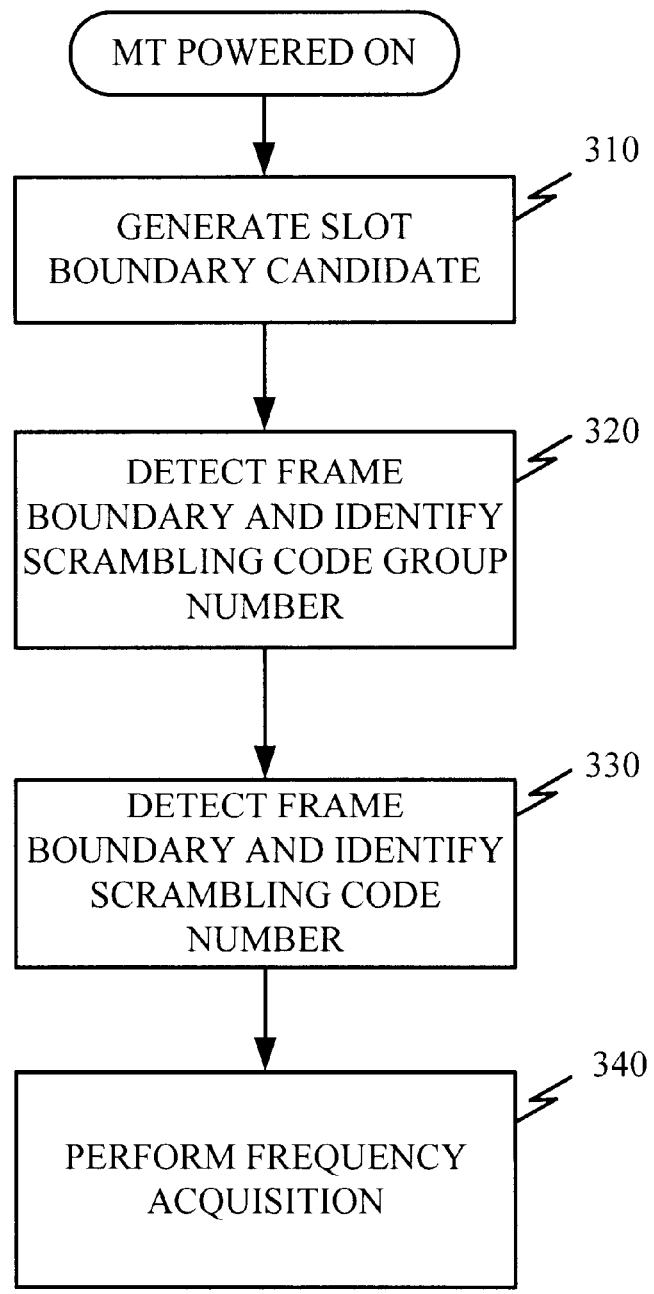
FIG. 3 illustrates an exemplary four-stage pipeline process, consistent with the present invention, by which the mobile terminal may perform an initial cell search.

FIG. 3 illustrates an exemplary four-stage pipeline process, consistent with the present invention, by which the mobile terminal 140 may perform an initial cell search. Upon power up, the mobile terminal 140 may generate a list of slot boundaries [act 310]. To do so, the mobile terminal 140 may search, through the use of a matched filter, for the primary synchronization code transmitted by the surrounding base stations 120. From the peaks of the output of the matched filter, the mobile terminal 140 can obtain slot synchronization with the cells in its receiving range. Assume, for simplicity, that the mobile terminal 140 generates a slot boundary list that includes only one slot boundary candidate. It will be appreciated, however, that the process described herein can be extended to generating more than one candidate in each stage.

Once slot synchronization has been obtained, the mobile terminal 140 knows the position of the secondary synchronization code. There may be 16 secondary synchronization codes mapped correspondingly to 16 secondary synchronization channel (S-SCH) symbols, labeled from 1 to 16. A frame of 15 such S-SCH symbols forms a codeword taken from a codebook of 64 codewords. The same codeword may be repeated every frame in a cell. These 64 codewords correspond to the 64 code groups used throughout the system. Thus, a code group can be detected by identifying the codeword transmitted in every S-SCH frame. Furthermore, the 64 codewords may be chosen to have distinct code phase shifts, and any phase shift of a codeword may be different from all phase shifts of all other codewords. With these properties, the mobile terminal 140 may detect the frame boundary and identify the scrambling code group for the slot boundary candidate in a well-known manner [act 320].

The mobile terminal 140 may use the identified frame boundary and scrambling code group pair to identify its corresponding scrambling codes [act 330]. The mobile terminal 140 may, for example, identify the primary scrambling code by correlating the Common Pilot Channel (CPICH) with all possible scrambling codes in the scrambling code group.

Finally, the mobile terminal 140 may perform a frequency acquisition process [act 340]. Here, the mobile terminal 140 may refine the frame boundary, determine a frequency estimate, detect the frequency error, and generate a detection metric to determine whether the cell search should continue. As will be described in more detail below, the mobile terminal 140 may compare the detection metric to a detection threshold. If the detection metric is greater than the detection threshold, then the mobile terminal 140 may select the frequency error estimate associated with the antenna configuration which is deemed more likely.

Figure 4A:
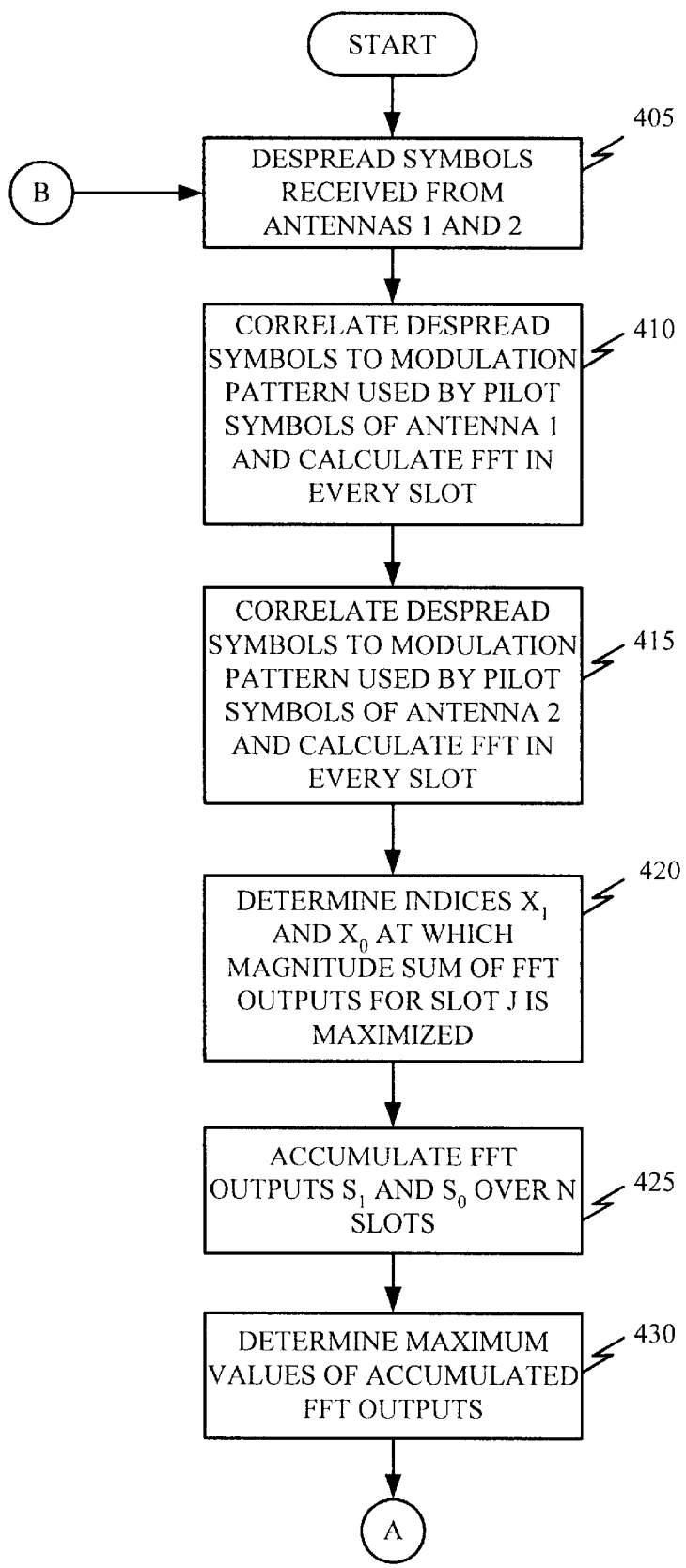
FIGS. 4A and 4B illustrate an exemplary frequency acquisition process consistent with the present invention.
Figure 4B:
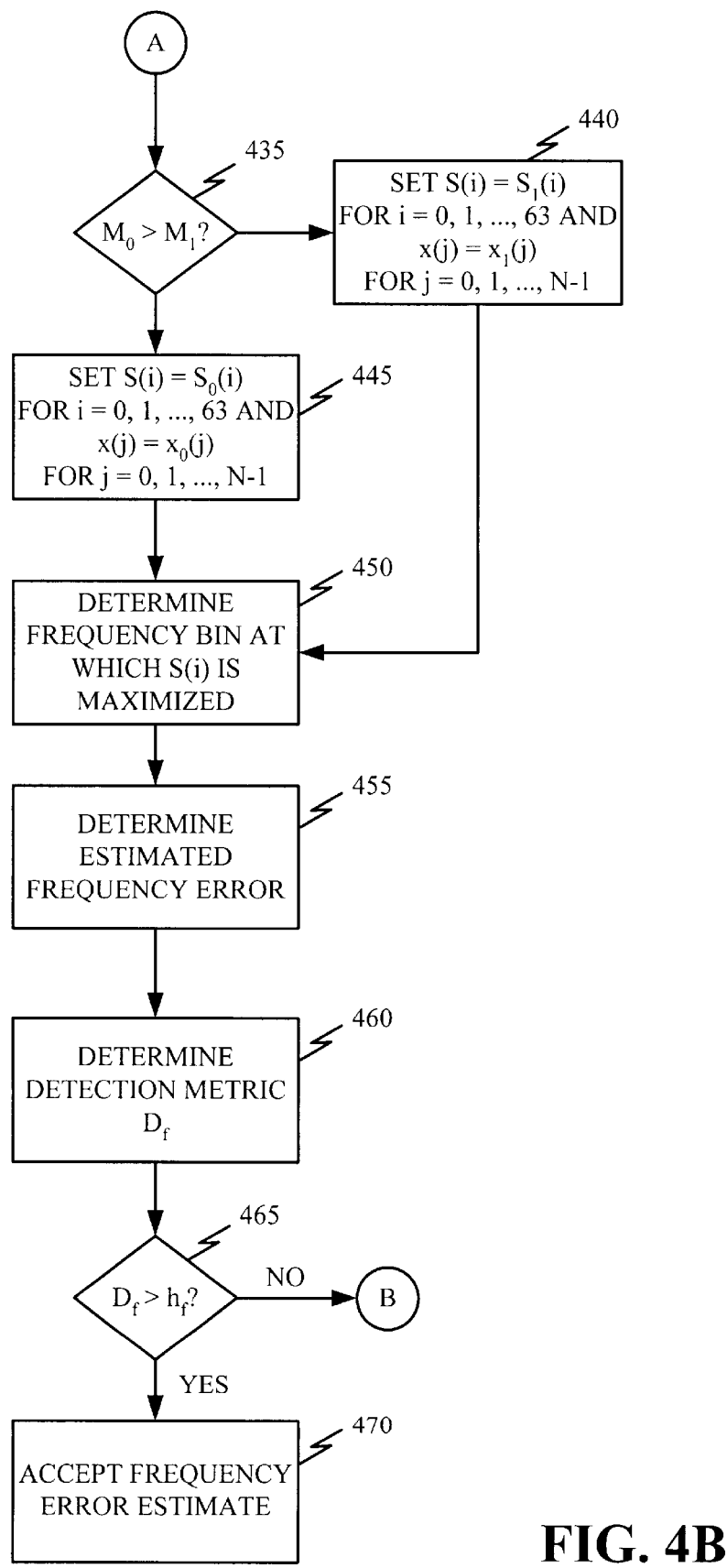

FIGS. 4A and 4B illustrate an exemplary frequency acquisition process consistent with the present invention. The mobile terminal 140 may receive signals from a single antenna (antenna 1), or may receive signals from two antennas (antennas 1 and 2) when the base station uses transmit diversity technology.

Processing may begin with the mobile terminal 140 despreading symbols received via a common control channel, such as the CPICH [act 405]. The mobile terminal 140 may, for example, despread the received CPICH symbols using a despreading factor of 64 and collect 40 despread values per slot.

The mobile terminal 140 may also correlate the despread values to the modulation pattern used by the pilot symbols of antenna 1, and calculate a 64-point Fast Fourier Transform (FFT) in every slot, after padding the despread values with zero, if necessary [act 410]. Assume for explanatory purposes that $F_1(i, j)$ is the FFT output at frequency $f_i$ for slot j. Assume further that the FFT outputs are ordered according to the ascending order of the corresponding frequency, i.e., $f_i < f_j$, i<j.

The mobile terminal 140 may also correlate the despread values to the modulation pattern used by the pilot symbols of antenna 2, and calculate a 64-point FFT in every slot, after zero padding [act 415]. Assume that $F_2(i, j)$ is the FFT output at frequency $f_i$ for slot j. Assume further that the FFT outputs for antenna 2 are ordered according to the ascending order of the corresponding frequency, i.e., $f_i < f_j$, i<j.

The mobile terminal 140 may determine the index at which the magnitude sum of the two FFT outputs (i.e., the FFT outputs for antennas 1 and 2) for slot j is maximized [act 420] using $$x_1(j) = \operatorname*{argmax}_i |F_1(i, j)| + |F_2(i, j)|.$$

The mobile terminal 140 may also determine the index at which the first FFT output (i.e., the FFT output for antenna 1) for slot j is maximized [act 420] using $$x_0(j) = \operatorname*{argmax}_i |F_1(i, j)|.$$

The mobile terminal 140 may repeat the above acts 405–420 and accumulate the values of the two FFT outputs and the values of the first FFT output over N slots [act 425] as follows, $$S_1(i) = \sum_{j=0}^{N-1} \frac{1}{2}(|F_1(i, j)| + |F_2(i, j)|)$$

$$S_0(i) = \sum_{j=0}^{N-1} |F_1(i, j)|.$$

The mobile terminal 140 may determine the maximum of $S_1(i)$ using $$I = \operatorname*{argmax}_i S(i).$$

and the maximum of $S_0(i)$ using $$\hat{f}_e = f_I + \left[ \frac{3S(I-1) - 4S(I) + S(I+1)}{2S(I-1) - 4S(I) + 2S(I+1)} - 1 \right] \delta f,$$

[act 430].

The mobile terminal 140 may then compare the maximum value $M_1$ to $M_0$ to determine whether transmit diversity is likely used by the base station [act 435] (FIG. 4B). If $M_1 \geq M_0$, indicating that transmit diversity is likely used by the base station, the mobile terminal 140 may set the accumulated FFT value $S(i)=S_1(i)$, for i=0, 1, . . . , 63, and the index $x(j)=x_1(j)$, for j=0, 1, . . . , N−1 [act 440]. If $M_0 > M_1$, indicating that transmit diversity is not likely used by the base station, the mobile terminal 140 may set the accumulated FFT value $S(i)=S_0(i)$, for i=0, 1, . . . , 63, and the index $x(j)=x_0(j)$, for j=0, 1, . . . , N−1 [act 445]. The mobile terminal 140 may determine the frequency bin at which the accumulated FFT value S(i) is maximized [act 450] using $$M_1 = \max_i S_1(i)$$

Figure 5A:
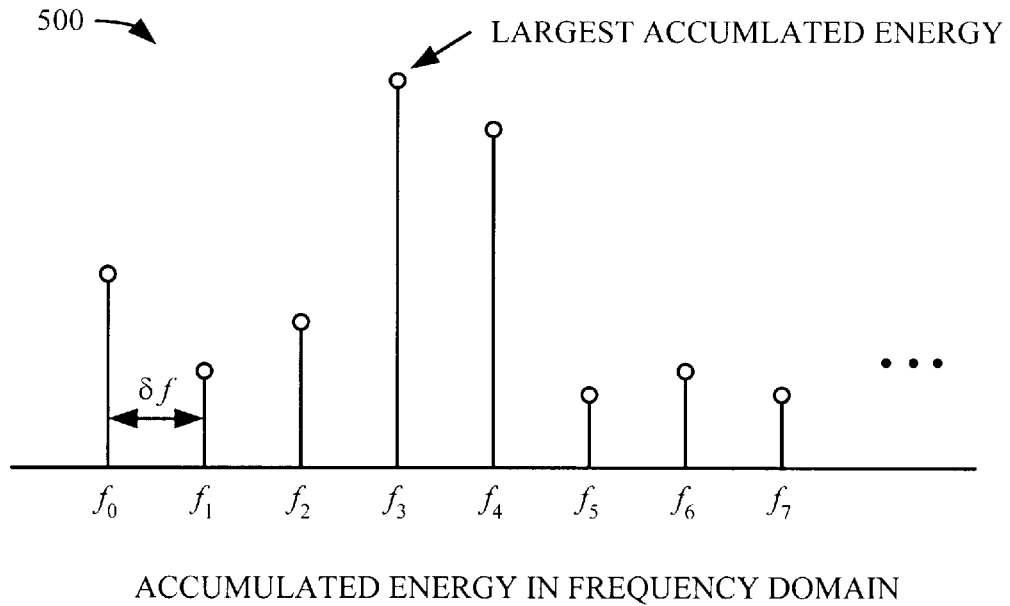
FIGS. 5A and 5B illustrate an exemplary quadratic interpolation algorithm consistent with the present invention.
Figure 5B:
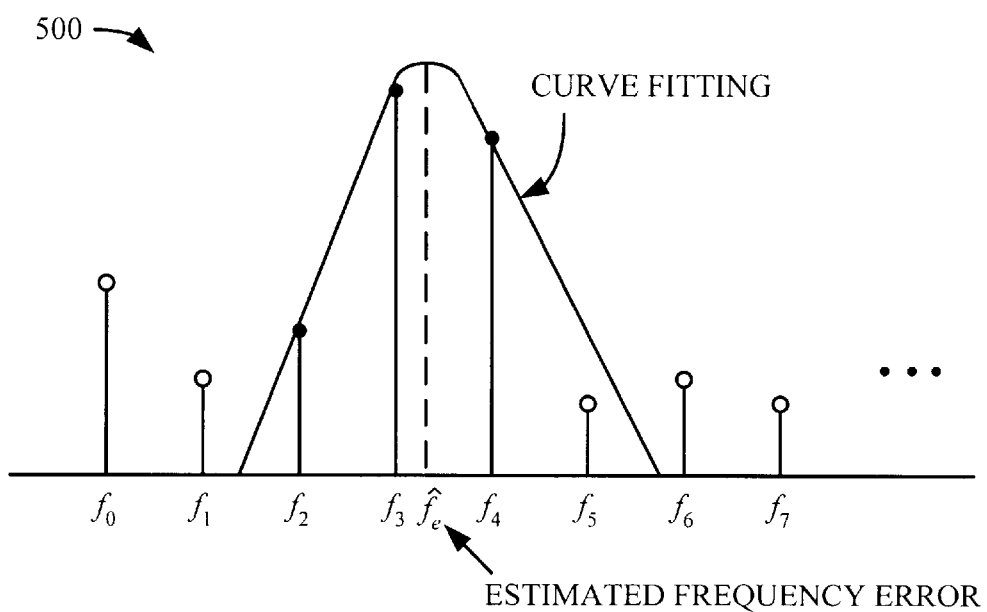

The mobile terminal 140 may determine the frequency error estimate by performing quadratic interpolation to determine the maximum of a quadratic curve going through (I−1, S(I−1)), (I, S(I)), and (I+1, S(I+1)) [act 455]. An exemplary quadratic interpolation algorithm 500 is illustrated in FIGS. 5A and 5B. It will be appreciated that other interpolation algorithms may alternatively be used. Using the quadratic interpolation algorithm 500 of FIGS. 5A and 5B, the estimated frequency error may be determined using $$M_0 = \max_i S_0(i)$$

where $\delta f$ is the frequency resolution of the FFT. According to the example in FIGS. 5A and 5B, I=3.

The mobile terminal 140 may determine the detection metric based on a majority vote [act 460] as follows:

$$v_f(i) = \sum_{j=0}^{N-1} I(x(j) = i), i = 0, 1, \ldots, 63.$$

The maximum value of $v_f(i)$ can be used as an indicator for the reliability of the frequency error estimate. If the true frequency error falls in the middle of two frequency bins, i.e., $f_e=(f_I+f_{I+1})/2$, the votes may be split between frequencies $f_I$ and $f_{I+1}$, reducing the probability of the maximum value of $v_f(i)$ exceeding the threshold. To solve this problem, the votes associated with two adjacent frequency bins are combined. Thus, $$v_f(i)=v_f(i)+v_f(i+1).$$

The detection metric may then be given by $$D_f = \max v_f(i).$$

The mobile terminal 140 may compare the detection metric $D_f$ to a predetermined detection threshold $h_f$ [act 465].

If the detection metric is greater than the detection threshold (i.e., $D_f > h_f$), the mobile terminal 140 may accept the frequency error estimate and the cell search terminates [act 470]. If, on the other hand, the detection metric is less than or equal to the detection threshold (i.e., $D_f \leq h_f$), the mobile terminal 140 continues the pipeline process.

Figure 6:
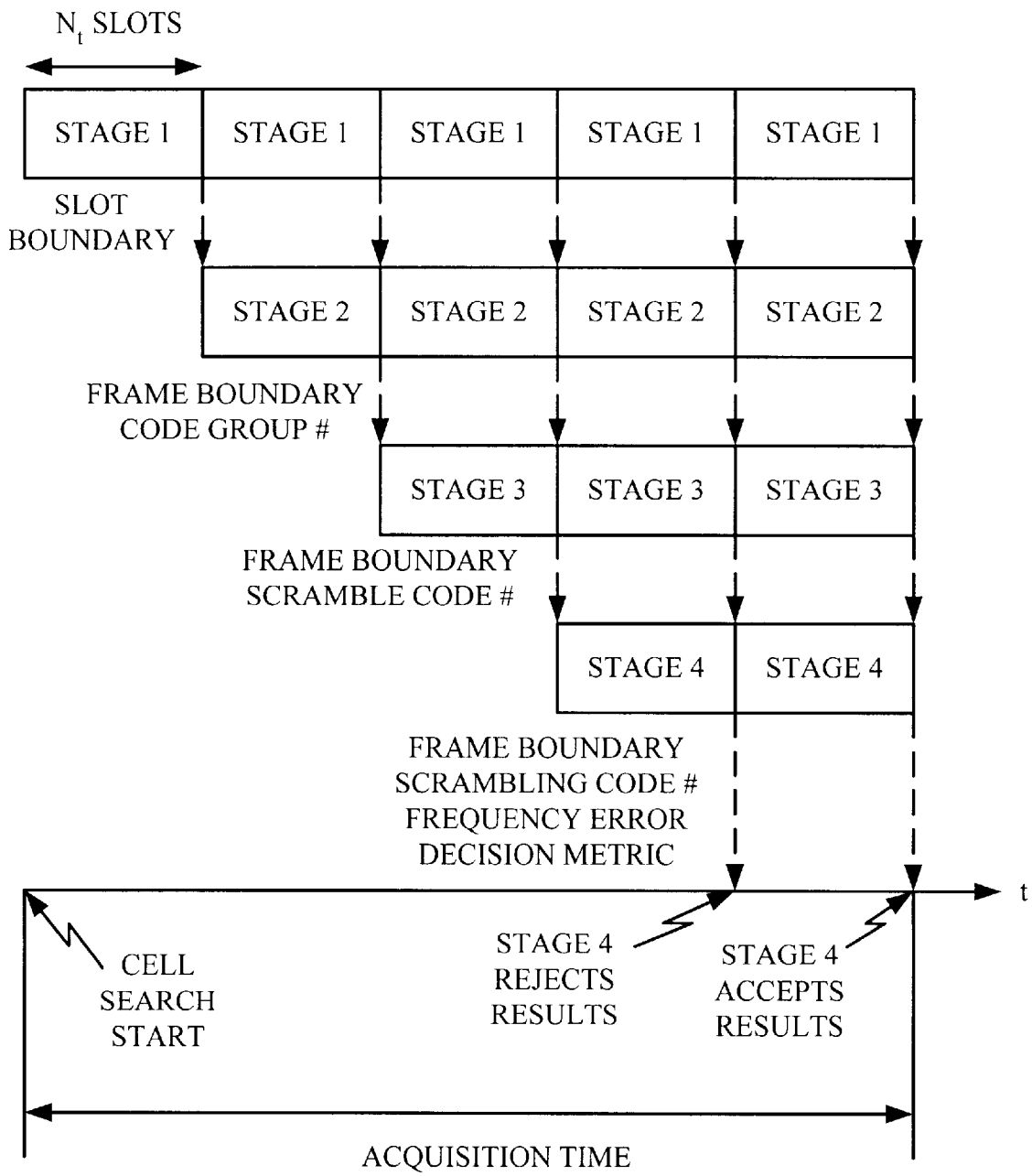
FIG. 6 illustrates an exemplary overview of the pipeline process described above with respect to FIG. 3.

FIG. 6 illustrates an exemplary overview of the pipeline process described above with respect to FIG. 3. As illustrated, each search stage may have the same synchronization time, including $N_t$ slots, and at the end of $N_t$ slots, each stage passes the results to its subsequent stage. In stage 1, the mobile terminal 140 generates a slot boundary candidate, which is obtained by detecting the peak of the primary synchronization code matched filter output. In stage two, the mobile terminal 140 uses the information received from stage 1 to determine the frame boundary and scrambling code group. In stage three, the mobile terminal 140 may determine, based on the stage two results, the frame boundary and scrambling code from the scrambling code group.

In stage four, the mobile terminal 140 may perform frequency acquisition and cell search verification and termination. Here, the mobile terminal 140 may refine the frame boundary determined in stage three, determines a frequency estimate, detects the frequency error, and generates a detection metric, as described above, that tells the mobile terminal 140 whether the cell search is to continue. The mobile terminal 140 compares the detection metric to a threshold value. If the detection metric is less than or equal to the threshold value, the mobile terminal 140 rejects the frequency error estimate and continues the pipelined process. If, on the other hand, the detection metric is greater than the threshold value, the mobile terminal 140 accepts the frequency error estimate.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, the described implementation includes software and hardware, but elements of the present invention may be implemented as a combination of hardware and software, in software alone, or in hardware alone. Also, while series of acts have been described with regard to FIGS. 3, 4A, and 4B, the order of the acts may be varied in other implementations consistent with the present invention. No element, act, or instruction used in the description of the present application should be construed as critical or essential to the invention unless explicitly described as such.

The present invention may be embodied as cellular communication systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may include any medium that can contain, store, communicate, propagate, or transport the program for use by, or in connection with, the instruction execution system, apparatus, or device. The computer-usable or computer-readable medium may include, for example, but not limited to, an electronic, magnetic, optical, electromagnetic, infrared, or semiconductor system, apparatus, device, or propagation medium.

More specific examples (a non-exhaustive list) of a computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Additionally, the present invention is described herein in the context of a WCDMA cellular communications system. While the present invention may be particularly useful for improving the performance of WCDMA cellular networks, it should be understood that the principles of the present invention may be applied to any cellular or wireless system utilizing other air interfaces. It should be further understood that the principles of the present invention may be utilized in hybrid systems that are combinations of two or more conventional air interfaces. In addition, a mobile terminal, in accordance with the present invention, may be designed to communicate with a base station transceiver using any standard based on GSM, TDMA, CDMA, FDMA, a hybrid of such standards or any other standard.

The scope of the invention is defined by the claims and their equivalents.

What is claimed is:

1. A method, performed by a mobile terminal, for selecting a frequency error estimate in a wireless communications network, comprising:

generating a slot boundary candidate;

identifying a scrambling code group using the slot boundary candidate;

identifying a scrambling code from the scrambling code group;

determining a frequency error estimate using the identified scrambling code;

determining a detection metric indicative of the reliability of the frequency error estimate;

comparing the detection metric to a predetermined threshold; and selecting the frequency error estimate when the detection metric is greater than the predetermined threshold.

2. The method of claim 1 wherein the determining a frequency error estimate using the identified scrambling code comprises:

despreading symbols received over a plurality of slots from at least first and second antennas, correlating the despread symbols to a modulation pattern used by pilot symbols of the first antenna, determining a Fast Fourier Transform (FFT) output for each slot correlated to the pilot symbol modulation pattern used by the first antenna, correlating the despread symbols to a modulation pattern used by pilot symbols of the second antenna, determining a FFT output for each slot correlated to the pilot symbol modulation pattern used by the second antenna, accumulating the FFT outputs from the first and second antennas, accumulating the FFT outputs from the first antenna, determining a first maximum value of the accumulated FFT outputs from the first and second antennas, determining a second maximum value of the accumulated FFT outputs from the first antenna, comparing the first maximum value to the second maximum value, setting an accumulated FFT value to the accumulated FFT outputs from the first and second antennas when the first maximum value is equal to or greater than the second maximum value, setting the accumulated FFT value to the accumulated FFT outputs from the first antenna when the first maximum value is less than the second maximum value, determining a frequency bin at which the accumulated FFT value is maximized, and determining the frequency error estimate based on the frequency bin.

3. The method of claim 2 wherein the determining a FFT output for each slot correlated to the pilot symbol modulation patterns used by the first and second antennas comprises:

zero padding the despread symbols, and determining a 64-point FFT in every slot.

4. The method of claim 1 further comprising:

re-performing the generating a slot boundary candidate, identifying a scrambling code group using the slot boundary candidate, identifying a scrambling code from the scrambling code group, determining a frequency error estimate using the identified scrambling code, determining a detection metric, and comparing the detection metric to a predetermined threshold when the detection metric is less than or equal to the predetermined threshold.

5. The method of claim 1 further comprising:

determining a frame boundary based on the slot boundary candidate.

6. The method of claim 1 wherein the generating a slot boundary candidate occurs in response to the mobile terminal powering up.

7. A mobile terminal comprising:

a memory that stores instructions; and a processor that executes the instructions to generate a slot boundary candidate, identify a scrambling code group using the slot boundary candidate, identify a scrambling code from the scrambling code group, determine a frequency error estimate using the identified scrambling code, determine a detection metric indicative of the reliability of the frequency error estimate, compare the detection metric to a predetermines threshold, and accept the frequency error estimate when the detection metric is greater than the predetermined threshold.

8. The mobile terminal of claim 7 wherein, when determining a frequency error estimate using the identified scrambling code, the processor:

despreads symbols received over a plurality of slots from at least first and second antennas, correlates the despread symbols to a modulation pattern used by pilot symbols of the first antenna, determines a Fast Fourier Transform (FFT) output for each slot correlated to the pilot symbol modulation pattern used by the first antenna, correlates the despread symbols to a modulation pattern used by pilot symbols of the second antenna, determines a FFT output for each slot correlated to the pilot symbol modulation pattern used by the second antenna, accumulates the FFT outputs from the first and second antennas, accumulates the FFT outputs from the first antenna, determines a first maximum value of the accumulated FFT outputs from the first and second antennas, determines a second maximum value of the accumulated FFT outputs from the first antenna, compares the first maximum value to the second maximum value, sets an accumulated FFT value to the accumulated FFT outputs from the first and second antennas when the first maximum value is equal to or greater than the second maximum value, sets the accumulated FFT value to the accumulated FFT outputs from the first antenna when the first maximum value is less than the second maximum value, determines a frequency bin at which the accumulated FFT value is maximized, and determines the frequency error estimate based on the frequency bin.

9. The mobile terminal of claim 8 wherein, when determining a FFT output for each slot correlated to the pilot symbol modulation patterns used by the first and second antennas, the processor:

pads the despread symbols with zeros, and determines a 64-point FFT in every slot.

10. The mobile terminal of claim 9 wherein the processor:

re-performs the generating a slot boundary candidate, identifying a scrambling code group using the slot boundary candidate, identifying a scrambling code from the scrambling code group, determining a frequency error estimate using the identified scrambling code, determining a detection metric, and comparing the detection metric to a predetermines threshold when the detection metric is less than or equal to the predetermined threshold.

11. The mobile terminal of claim 7 wherein the processor further:

determines a frame boundary using the slot boundary candidate.

12. The mobile terminal of claim 7 wherein the processor generates a slot boundary candidate in response to the mobile terminal powering up.

13. A computer-readable medium containing instructions for controlling at least one processor to perform a method for selecting a frequency error estimate in a wireless network, the method comprising:

generating a slot boundary candidate;

identifying a scrambling code group using the slot boundary candidate;

identifying a scrambling code from the scrambling code group;

determining a frequency error estimate using the identified scrambling code;

determining a detection metric indicative of the reliability of the frequency error estimate;

comparing the detection metric to a predetermines threshold; and selecting the frequency error estimate when the detection metric is greater than the predetermined threshold.

14. The computer-readable medium of claim 13 wherein the determining a frequency error estimate using the identified scrambling code comprises:

despreading symbols received over a plurality of slots from one or more antennas, correlating the despread symbols to a modulation pattern used by pilot symbols of each antenna, determining a Fast Fourier Transform (FFT) output for each slot correlated to the pilot symbol modulation patterns used by a first antenna and at least a second antenna, accumulating the FFT outputs from the first and second antennas, accumulating the FFT outputs from the first antenna, determining a first maximum value of the accumulated FFT outputs from the first and second antennas, determining a second maximum value of the accumulated FFT outputs from the first antenna, comparing the first maximum value to the second maximum value, setting an accumulated FFT value to the accumulated FFT outputs from the first and second antennas when the first maximum value is equal to or greater than the second maximum value, setting the accumulated FFT value to the accumulated FFT outputs from the first antenna when the first maximum value is less than the second maximum value, determining a frequency bin at which the accumulated FFT value is maximized, and determining the frequency error estimate based on the frequency bin.

15. A pipelined system for selecting a frequency error estimate in a wideband code division multiple access (WCDMA) system, comprising:

a first stage that generates a slot boundary candidate for at least one antenna in the WCDMA system;

a second stage that receives the slot boundary candidate and identifies a scrambling code group using the slot boundary candidate;

a third stage that receives the identified scrambling code group and identifies a scrambling code from the scrambling code group; and a fourth stage that receives the identified scrambling code, determines a frequency error estimate using the scrambling code, generates a detection metric indicative of the reliability of the frequency error estimate, and selects the frequency error estimate when the detection metric exceeds a threshold.

16. A four-stage pipelined system comprising:

a first stage that detects a slot boundary;

a second stage that receives the slot boundary and identifies a frame boundary and scrambling code group based on the slot boundary;

a third stage that receives the frame boundary and the scrambling code group and identifies at least one scrambling code based on the frame boundary and the scrambling code group; and a fourth stage that receives the scrambling code and performs frequency acquisition and cell search verification and termination by determining a detection metric indicative of the reliability of the frequency error estimate.

17. The system of claim 16 wherein, when performing the frequency acquisition, the fourth stage;

despreads symbols received over a plurality of slots from first and second antennas, correlates the despread symbols to a modulation pattern use by pilot symbols of the first antenna, determines a Fast Fourier Transform (FFT) output for each slot correlated to the pilot symbol modulation pattern used by the first antenna, correlates the despread symbols to a modulation pattern used by the second antenna, determines a FFT output for each slot correlated to the plot symbol modulation pattern used by the second antenna, accumulates the FFT outputs from the first and second antennas, accumulates the FFT outputs from the first antenna, determines a first maximum value of the accumulated FFT outputs from the first and second antennas, determines a second maximum value of the accumulated FFT outputs from the first antenna, compares the first maximum value to the second maximum value, sets an accumulated FFT value to the accumulated FFT outputs from the first and second antennas when the first maximum value is equal to or greater than the second maximum value, sets the accumulated FFT value to the accumulated FFT outputs from the first antenna when the first maximum value is less than the second maximum value, determines a frequency bin at which the accumulated FFT value is maximized, and determines a frequency error estimate based on the frequency bin.

18. The system of claim 17 wherein the fourth stage further:

compares the detection metric to a predetermined threshold, and selects the frequency error estimate when the detection metric is greater than the predetermined threshold.

* * * * *